May 7, 1935.    J. FERGUSON    2,000,278
ELECTRIC FURNACE
Filed May 18, 1934
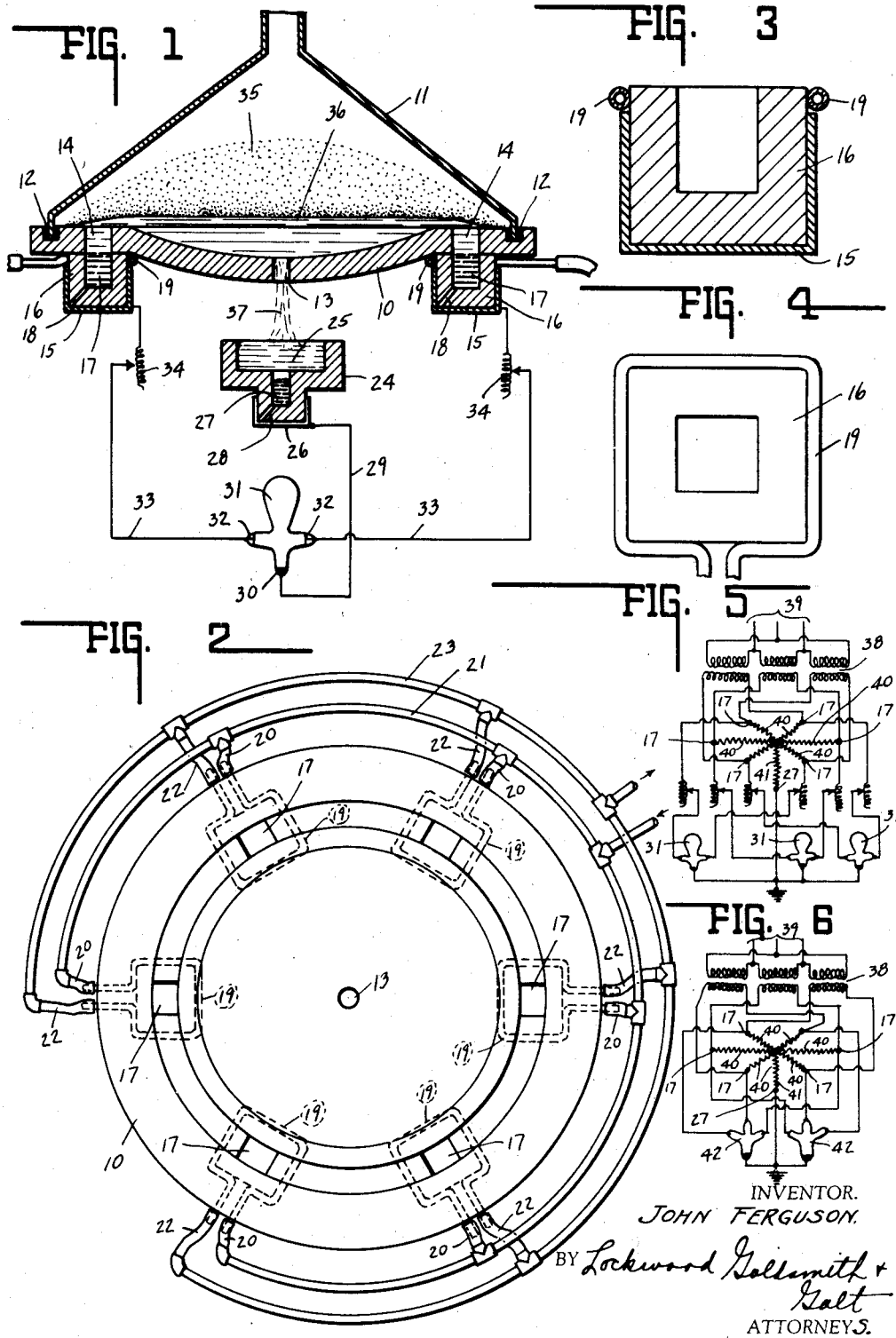
INVENTOR.
JOHN FERGUSON.
BY Lockwood Goldsmith & Galt
ATTORNEYS.

Patented May 7, 1935

2,000,278

UNITED STATES PATENT OFFICE 2,000,278

ELECTRIC FURNACE

John Ferguson, Indianapolis, Ind., assignor to Fairmount Glass Works, Inc., Indianapolis, Ind., a corporation Application May 18, 1934, Serial No. 726,271

9 Claims. (Cl. 13—6)

This invention relates to an electric furnace and is particularly applicable to electric glass furnaces of the type disclosed in my co-pending applications Serial No. 696,373, filed November 2, 1933 and Serial No. 697,565, filed November 11, 1933.

One object of the present invention is to provide means for preventing escape of molten glass through interstices in the refractory lining of the furnace, particularly at the junction between the refractory linings of the electrode boxes and the furnace proper. If molten glass is permitted to leak through the refractory at this junction it normally comes in contact with the metal of the electrode box and conducts a certain amount of current. The current in turn heats the escaping glass, maintaining it in a molten state and aggravating the trouble. In the present invention means are provided to chill the escaping glass and to cause it to change to the solid state. Since solid glass is not a conductor, no short circuit current can pass through it and the frozen glass acts as a dam or seal to prevent further escape of molten glass.

Another object of the invention is to provide means for heating a stream of glass passing through the discharge orifice of the furnace in order to retain it in the molten state for molding or other working. This is particularly important in the manufacture of "Pyrex" and other hard glass which has a relatively high freezing point, since such glass is apt to chill when discharged in a small stream unless it is heated in the furnace to a relatively high temperature. This object is accomplished in the present invention by passing an electric current through the descending stream of glass, the energy liberated by said current heating the glass in said stream.

Another object of the invention is to increase the tendency to self movement of the molten glass within the furnace proper in order to give a more thorough mixing for the production of a homogeneous product. This is accomplished by the use of the current passing into the body of the glass from the issuing stream in such manner that it passes successively to each of a plurality of electrodes spaced about the furnace hearth. Preferably a pulsating direct current is used for the purpose, the pulsations having the same frequency as the alternating currents passing between the electrodes for heating the glass on the hearth. The pulsating currents sweeping around the furnace successively to each electrode interact electrostatically with the alternating currents to produce attractive and repulsive forces in the glass which tend to cause movement of the glass itself.

Other objects and features of the invention will be understood from the accompanying drawing and the following description and claims:

Fig. 1 is a central vertical section through a glass furnace constructed in accordance with the invention. Fig. 2 is a plan view of the same with the covering hood removed. Fig. 3 is a vertical sectional view of one of the electrode boxes showing the preferred position of the cooling apparatus therefor. Fig. 4 is a plan view of the same. Fig. 5 is a diagram of wiring connection illustrating one method of the connection of the rectifier for supplying direct current to the stream of glass leaving the furnace. Fig. 6 is a similar diagram showing another arrangement of rectifier connections.

The furnace proper consists of a refractory floor or hearth 10 constructed in a shallow dish-shaped form together with a cover hood 11 having an air-tight seal 12 with the outer edge of the hearth 10. A discharge opening 13 is provided at the center of the hearth 10 and a number of electrode wells 14 are spaced about the outer edge of the hearth. Associated with each electrode well 14 there is a metallic electrode box 15 having a refractory lining 16 within which there is carried an electrode 17 preferably of molten lead. A passage 18 through the refractory lining 16 permits contact of the electrode material with the metallic box 15. About the upper edge of each electrode box 15 there is placed a coil 19 of pipe. The said coils are located adjacent the junction between the refractory lining of the hearth proper and that of the electrode boxes so that glass leaking through the said junction will come in contact with said coils. One end of each of the coils 19 is connected by means of rubber hose connection 20 to an inlet pipe 21. The opposite end of each of the coils is connected by hose connection 22 to an outlet pipe 23. The cooling medium is supplied through the intake pipe 21 and is removed through the discharge pipe 23. The said cooling medium is preferably an electrical non-conductor, such as distilled water, which may be cooled and recirculated to avoid loss. The hose connections 20 and 22 are preferably formed of rubber or other non-conducting material to prevent the short-circuiting or grounding of the electrode boxes. If desired, the pipes 21 and 23 may also be provided in the form of non-conducting hose connections.

By means of this construction glass which may leak between the lining of the furnace proper and that of the electrode box will be immediately chilled by contact with the cooling coils 19. When so chilled, the glass becomes solid and ceases to be a conductor of electricity. The solid glass acts as a dam or seal to prevent further leakage of glass.

Beneath the discharge opening 13 there is provided a feeder 24 having an electrode well 25 at the bottom thereof. The well 25 is provided with a refractory lined metallic electrode box 26 containing an electrode 27 having contact with the box 26 by means of an opening 28 in the refractory lining. The box 26 is electrically connected by a conductor 29 to the cathode 30 of a mercury arc rectifier 31. The two anodes 32 of the rectifier are connected by conductors 33 to the two electrodes 17, variable inductors or sustaining coils 34 being inserted in the conductors 33. By means of this arrangement, when an alternating voltage is supplied by any suitable means across the two electrodes 17 shown in Fig. 1, a current passes between the same to melt the batch 35 of glass material in the hearth and to form a pool 36 of molten glass on the hearth. A stream 37 of the said glass escapes through the discharge opening 13 to the feeder 24 and makes electrical contact with the electrode 27 in said feeder.

When the rectifier 31 is set in operation, direct current passes alternately from each of the electrodes 17 through the corresponding conductor 33 to the rectifier, thence through the conductor 29, electrode 27, through the descending stream of glass 37 and the body of glass 36 back to the corresponding electrode 17. These direct currents have the pulsating character of currents rectified by the method shown, the pulsations being alternately at a maximum for each of the electrodes 17. By means of this arrangement the stream of glass 37 is kept in a heated condition and prevented from chilling. When a hard glass is being formed in the furnace, the temperature therein may be maintained at a lower degree without danger of chilling the outgoing stream.

In Fig. 2 the furnace is shown as having six electrodes 17 and in Figs. 5 and 6 wiring diagrams for such a furnace are illustrated. In Fig. 5 the electrodes 17 are connected in pairs across the secondary windings of a bank of transformers 38, the primary windings of which are supplied with three-phase alternating current by means of power mains 39. The electrodes 17 are approximately equally spaced about the furnace and pairs of oppositely positioned electrodes are connected to the terminals of each of the secondary windings of the transformers. Thus the current paths within the furnace are diametric as indicated by the resistances 40 in Fig. 5 and intersect at a point in the furnace above the discharge opening 13. The resistance of the descending stream 37 is indicated in the diagram at 41. Each pair of oppositely positioned electrodes 17 has associated therewith in the manner shown in Fig. 1 a rectifier 31, the cathodes of all of the said rectifiers being connected to the electrode 27. By means of this arrangement a substantially uniform direct current is maintained in the stream 37 by a plurality of pulsating direct currents passing from the discharge opening 13 successively to each of the electrodes 17. The direct currents may be considered, therefore, as consisting of a wave of direct current rotating about the furnace superimposed upon the alternating current passing therethrough. The electrostatic and electromagnetic interaction of the two groups of currents tend to cause motion of the glass pool 36 which in turn promotes the uniformity of mixing of the glass material to give a more homogeneous product.

In Fig. 6 there is illustrated a variation of the connections using three-phase rectifiers. In this diagram like numbered parts have like functions to those illustrated in Fig. 5. However, two three-phase rectifiers 42 are employed each having its cathode connected to the electrode 27 and having each of its three anodes connected to one of the electrodes 17. In this arrangement alternate electrodes 17 are connected to each of the rectifiers 42. The said rectifiers are able to operate, therefore, without the use of sustaining coils, while the same succession of pulsating direct currents is produced in the mass of glass within the furnace.

The foregoing specification describes in detail one embodiment of the invention but is not intended to limit the scope thereof to the exact details illustrated which may be varied within wide limits by those skilled in the art without departing from the invention as defined in the appended claims.

The invention claimed is:

1. In an electric furnace, the combination of a hearth having a refractory lining, a refractory lined electrode box, and cooling means adjacent the junction of the said refractory linings for chilling glass which may seep through said junction.

2. In an electric furnace, the combination of a hearth having a refractory lining, a metallic electrode box, and cooling means adjacent the upper edge of said box at its junction with said refractory lining for chilling molten glass which may seep therebetween thus preventing said seepage glass from conducting current to or from the body of molten glass on the hearth.

3. In an electric furnace having a hearth and an electrode box the combination of cooling coils adjacent the junction of said hearth and box, and connections supplying a cooling medium to said coils, said connections being formed at least in part of an electrically non-conducting material.

4. In a glass furnace, the combination of a hearth having a discharge opening in the floor thereof, a plurality of electrodes in electrical contact with molten glass on said hearth, means for passing electric currents between said electrodes, and means for passing an electric current through the stream of glass issuing from said opening to at least one of said electrodes.

5. In a glass furnace, the combination of a hearth having a discharge opening in the floor thereof, a plurality of electrodes in electrical contact with molten glass on said hearth, means for passing alternating electric currents between said electrodes, and means for passing a direct current through the stream of glass issuing from said opening to at least one of said electrodes.

6. In a glass furnace, the combination of a hearth having a discharge opening in the floor thereof, a plurality of electrodes spaced about said hearth in electrical contact with molten glass thereon, circuits arranged to supply alternating currents between said electrodes, and other circuits arranged to supply direct currents through a stream of glass issuing from said opening successively to each of said electrodes.

7. In a glass furnace, the combination of a hearth having a discharge opening in the floor thereof, two electrodes in electrical contact with molten glass on said hearth, a circuit arranged to impress an alternating voltage across said electrodes to pass a current between them through said glass, and a rectifier having a cathode electrically connected to a stream of glass issuing from said opening and having an anode connected to each of said electrodes.

8. In a glass furnace, the combination of a hearth having a discharge opening in the floor thereof, two electrodes in electrical contact with molten glass on said hearth, a circuit arranged to impress an alternating voltage across said electrodes to pass a current between them through said glass, and a rectifier having a cathode electrically connected to a stream of glass issuing from said opening and having an anode connected to one of said electrodes.

9. In a glass furnace, the combination of a hearth having a discharge opening in the floor thereof, a plurality of electrodes spaced about said hearth and arranged in pairs on opposite sides of said opening, circuits passing alternating currents between said electrodes in paths intersecting adjacent said opening, and rectifiers having cathodes electrically connected to a stream of glass issuing from said opening and having anodes connected to said electrodes.

JOHN FERGUSON.